(12) United States Patent
Rivera et al.

(10) Patent No.: US 9,351,098 B2
(45) Date of Patent: May 24, 2016

(54) PROVIDING ACCESS TO AND ENABLING FUNCTIONALITY OF FIRST DEVICE BASED ON COMMUNICATION WITH SECOND DEVICE

(71) Applicant: LENOVO (SINGAPORE) PTE. LTD., New Tech Park (SG)

(72) Inventors: David Rivera, Raleigh, NC (US); Peter Hamilton Wetsel, Raleigh, NC (US); Philip John Jakes, Durham, NC (US); Daniel Justin Hebel, Raleigh, NC (US); Joseph Nicholas Laltrello, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 14 days.

(21) Appl. No.: 14/281,145

(22) Filed: May 19, 2014

(65) Prior Publication Data
US 2015/0334511 A1   Nov. 19, 2015

(51) Int. Cl.
| | |
|---|---|
| H04B 7/00 | (2006.01) |
| H04W 4/00 | (2009.01) |
| H04W 12/06 | (2009.01) |
| H04W 12/08 | (2009.01) |
| H04L 29/06 | (2006.01) |
| H04M 1/725 | (2006.01) |
| H04B 1/68 | (2006.01) |

(52) U.S. Cl.
CPC ........... *H04W 4/008* (2013.01); *H04L 63/0492* (2013.01); *H04L 63/061* (2013.01); *H04M 1/72597* (2013.01); *H04W 12/06* (2013.01); *H04W 12/08* (2013.01)

(58) Field of Classification Search
CPC ... H04W 4/008; H04W 84/18; H04M 1/7253; H04M 2250/02
USPC ................................. 455/41.1–41.3, 410–411
See application file for complete search history.

(56) References Cited

U.S. PATENT DOCUMENTS

| | | | | |
|---|---|---|---|---|
| 2008/0186184 | A1* | 8/2008 | August | G06F 21/88 340/572.7 |
| 2014/0220883 | A1* | 8/2014 | Emigh | H04H 20/61 455/3.01 |
| 2015/0140982 | A1* | 5/2015 | Postrel | H04W 4/008 455/418 |

* cited by examiner

*Primary Examiner* — Lee Nguyen
(74) *Attorney, Agent, or Firm* — John L. Rogitz; John M. Rogitz

(57) ABSTRACT

In one aspect, a device includes a processor and a memory accessible to the processor. The memory bears instructions executable by the processor to receive at least a first Bluetooth low energy (BLE) signal from a BLE beacon and enable a first function of the first device at least in part in based on receipt of the first BLE signal.

27 Claims, 6 Drawing Sheets

FIG. 6

| Beacon or dock (602) | Enable (604) | Disable (606) |
|---|---|---|
| first beacon | All | N/A |
| second beacon | Hard disk drive section 1<br>email communication<br>peripheral device use<br>server access | Text and telephone<br>communication<br>camera photosharing |
| first dock | Access to projector<br>display<br>Word processing<br>application | Internet access |

| | functions enabled | functions disabled |
|---|---|---|
| first beacon | All (702) [change] | N/A (704) [change] |
| second beacon | Hard disk drive section 34 access [change] (706) | Access to Game Center and Music Player [change] (708) |
| [Add beacon] (710) | | |
| [Add docking station] (712) | | |

PROVIDING ACCESS TO AND ENABLING FUNCTIONALITY OF FIRST DEVICE BASED ON COMMUNICATION WITH SECOND DEVICE

I. FIELD

The present application relates generally to providing access and/or enabling functionality of a first device based on communication with a second device.

II. BACKGROUND

Authenticating devices can be difficult for many users owing to the steps that are to be taken. Indeed, these steps can be laborious and confusing. Notwithstanding, secure computing environments often require authentication of a device for the device to access the environment, relegating users to such laborious and confusing authentication of their devices.

Furthermore, there are instances where access to data on a device is be limited, as are other functions of the device, so as to e.g. not compromise the data and/or provide unapproved access.

SUMMARY

Accordingly, in one aspect, a device includes a processor and a memory accessible to the processor. The memory bears instructions executable by the processor to receive at least a first Bluetooth low energy (BLE) signal from a BLE beacon and enable a first function of the first device at least in part in based on receipt of the first BLE signal.

In another aspect, a method includes receiving, at a device, at least one signal from a beacon. The method also includes providing a first level of access to the device responsive to determining that the signal is from a first beacon, and providing a second level of access to the device different from the first level of access responsive to determining that the signal is from a second beacon different from the first beacon.

In still another aspect, a first device includes a processor and a memory accessible to the processor. The memory bears instructions executable by the processor to engage the first device with a docking station, and permit a level of access to the device at least in part in response to engagement of the first device with the docking station. The first level of access is otherwise not permitted.

In yet another aspect, an apparatus includes a container which provides a first level of electromagnetic isolation, a network interface which is accessible from the container and which provides access to a network that extends beyond the electromagnetic isolation of the container, a sensor which detects the presence of at least one device within the container, and circuitry which automatically authenticates the device upon placement in the container and which provides to the device network access through the network interface in response to the sensor sensing the presence of at least one device.

In another aspect, a apparatus includes a display, a network interface, a memory which stores executable code, and a processor which is operatively coupled to the display, the network interface, and the memory. The processor executes code stored in the memory to, in response to execution of the code, authenticate to an electromagnetically-isolated environment available through the network interface and grant access to a subset of available resources, where the subset corresponds to the electromagnetically-isolated environment.

The details of present principles, both as to their structure and operation, can best be understood in reference to the accompanying drawings, in which like reference numerals refer to like parts, and in which:

BRIEF DESCRIPTION OF THE DRAWINGS

FIG. 6 is an example data table in accordance with present principles;

FIG. 7 is an example user interface (UI) in accordance with present principles.

DETAILED DESCRIPTION

Figure 1:
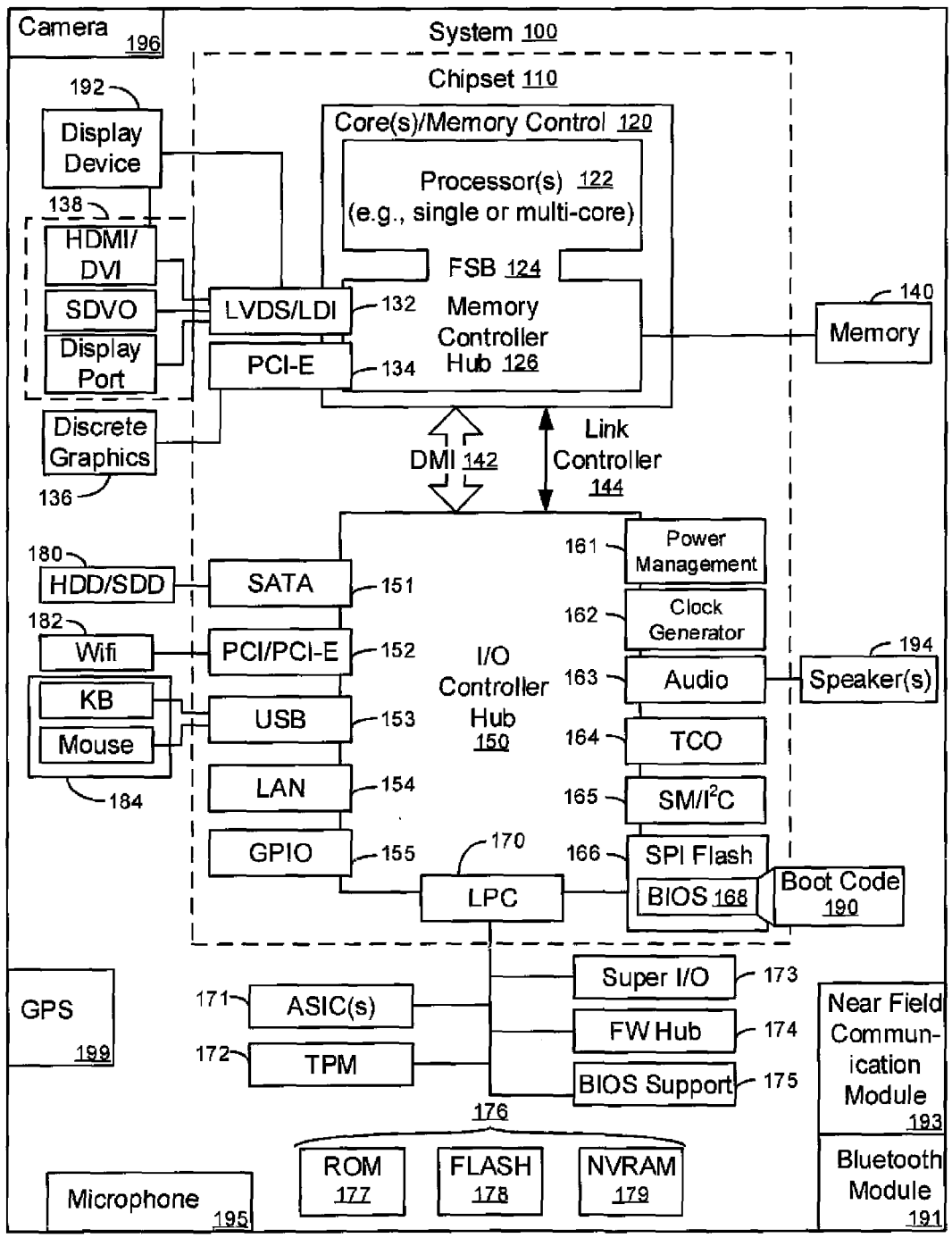
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various subroutines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video.

Also included as part of the system 100 is a Bluetooth module 191 for communication with other devices, including the Bluetooth and/or BLE beacons discussed herein. Further still, a near field communication (NFC) module 193 is shown for NFC communication with other devices, including e.g. an NFC beacon. With respect to the Bluetooth module 191, it may be implemented as a Bluetooth Low Energy (BLE) module and/or a Bluetooth 4.0 module that implements communications using one or more of BLE systems, standard Bluetooth systems, and/or iBeacon systems specifically. As understood herein, BLE may operate in the same spectrum range (the 2.400 GHz-2.4835 GHz band) as classic Bluetooth technology, but may use a different set of channels. Instead of Bluetooth's seventy nine 1-MHz channels, e.g. BLE employ forty 2-MHz channels. BLE may send data within a channel using Gaussian frequency shift modulation with a one megabyte per second data rate and a maximum transmission power of ten milliWatts (10 mW).

Still in reference to FIG. 1, a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
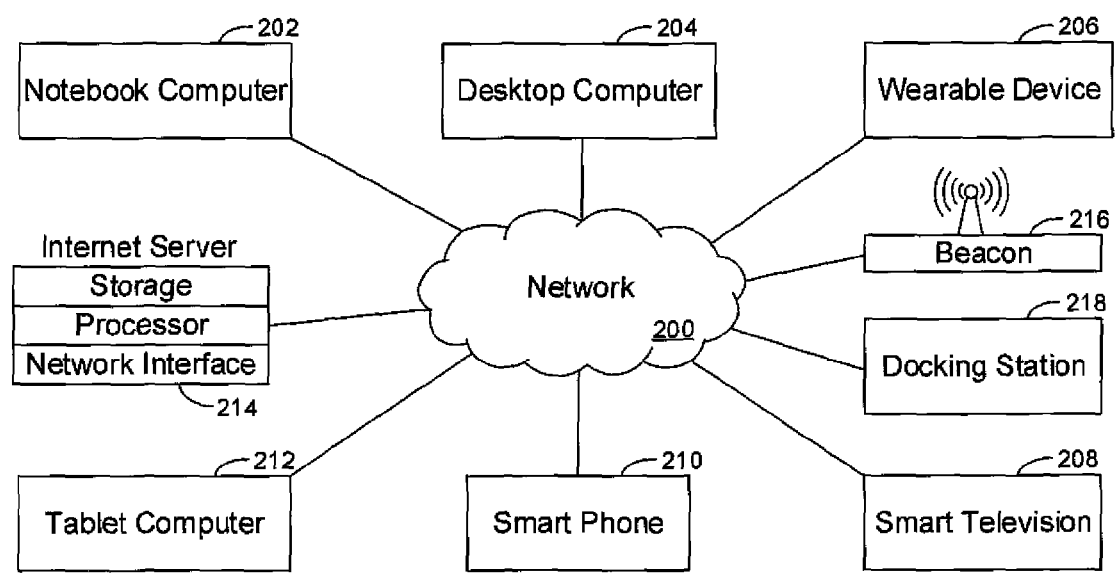
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Moreover, each of the devices 202-214 may communicate with the beacon 216 shown in FIG. 2. The beacon 216 may be e.g. a BLE beacon, and even e.g. an iBeacon beacon, but may also communicate over still other wireless technologies and/or beacons such as e.g. NFC communication and/or an NFC beacon. In any case, it is to be understood that the beacon 216 may be e.g. a so-called "stand-alone" device as shown, although present principles recognize it may be incorporated into any of the devices described herein. In any case, it is to be understood that the beacon 216 may wirelessly transmit (e.g. broadcast) signals which may be received by the devices 202-214 when within range of the beacon 216. It is to be further understood that the signals transmitted by the beacon 216 may contain data pertaining to the location (e.g. a room of a structure) in which the beacon 216 is disposed in accordance with present principles, and may also transmit and receive data from the devices 202-214 such as for e.g. authentication and encryption purposes as discussed further below. Also, though not shown it is to be understood that in some embodiments the beacon 216 may be connected to the network 200.

Still in reference to FIG. 2, the network 200 may include a docking station 218 for docking another device such as e.g. the tablet computer 212, smart phone 210, etc. Note that as shown, the docking station 218 may be connected to the network 200. In any case, it is to be understood that the docking station e.g. may include one or more processors, as well as its own e.g. hard disk drive (HDD) and/or one or more interfaces such as e.g. USB interfaces for communicatively connecting the docking station to e.g. a keyboard, display, speakers, and/or any of the devices 202-216. Furthermore, the docking station may also include a power source for providing power to the docking station 218 and/or any device engaged therewith.

Figure 3:
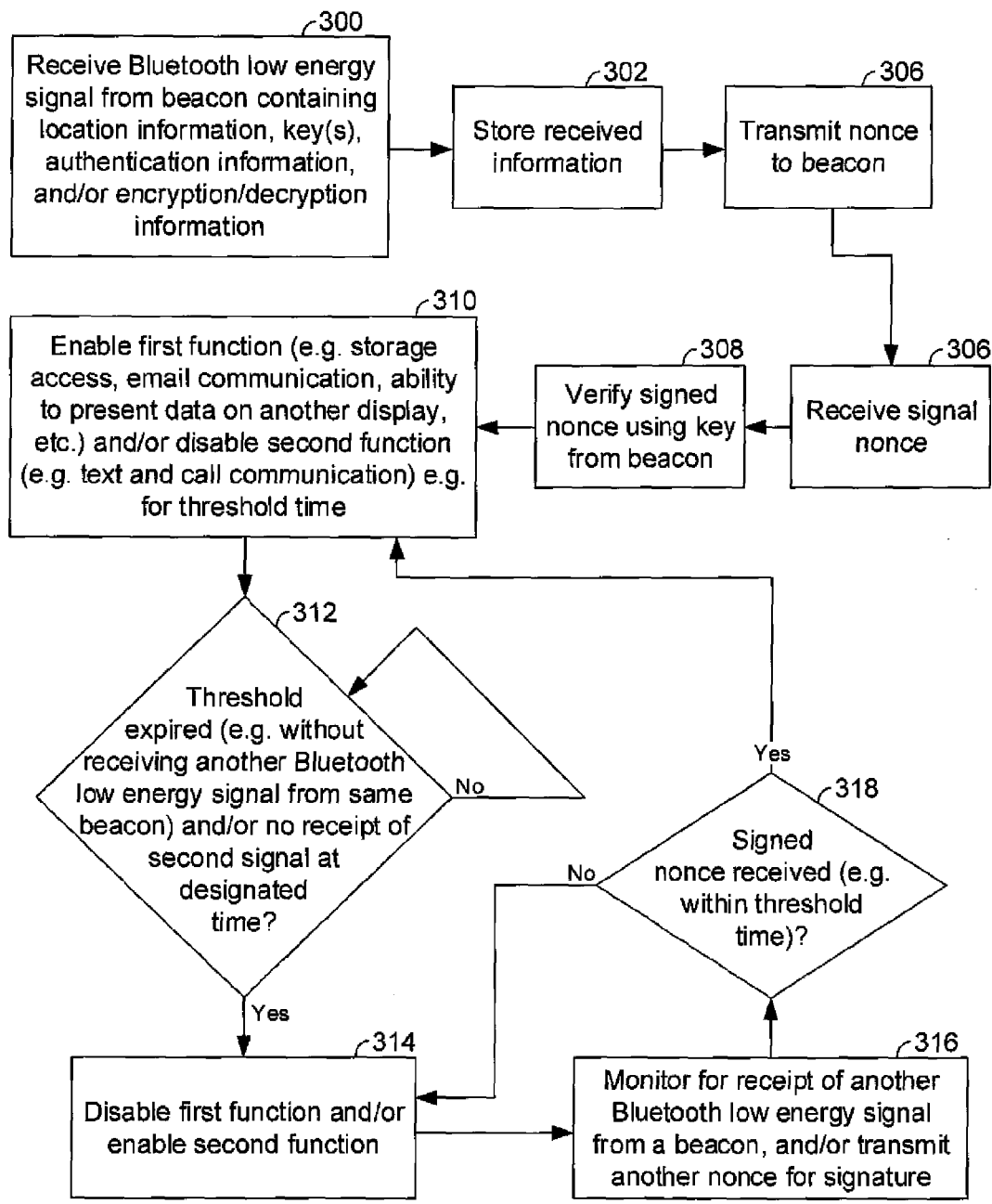
FIGS. 3-5 are flow charts showing example algorithms in accordance with present principles.

Referring to FIG. 3, it shows example logic that may be undertaken by a device such as the system 100 (referred to below as the present device) in accordance with present principles. Beginning at block 300, the logic receives at least a first (e.g. Bluetooth low energy (BLE)) signal from a (e.g. BLE) beacon. The signal(s) may contain one or more of location information for the location of the beacon and/or present device, one or more keys such as e.g. public (e.g. encryption) keys, digital certificates, authentication information, and/or other encryption and/or decryption information. The logic then proceeds to block 302 at which the logic stores the received information (e.g. locally at the present device) and then proceeds to block 304.

At block 304 the logic transmits a nonce (e.g. a random nonce) to the beacon and at block 306 receives back a signed and/or executed version of the nonce. Note that although not shown in FIG. 3, should a signed nonce not be received from the beacon, the logic may end at block 306. In any case, from block 306 the logic proceeds to block 308, at which the logic verifies the signed nonce using e.g. a key such as a public encryption key that was received from the beacon at block 300. Note that although not shown in FIG. 3, should the signed nonce not be verified, the logic may end at block 308.

Regardless, from block 308 the logic moves to block 310 where the logic enables (e.g. for a threshold time) at least one function (e.g. software function, hardware function, or both) of the present device at least in part in based on verification of the signed nonce at block 308 and/or receipt of the signal(s) at block 300. E.g., at block 310 the logic may enable access to a storage area of the present device, may enable email communication using the present device, may enable the ability of the present device to present data on another display with which the present device may be or is enabled to communicate with, etc. Also at block 310, the logic may disable (e.g. for a threshold time, whether it be the same threshold time as for enablement of functions as described immediately above or for another threshold time different from the first threshold time) at least one function (e.g. software function, hardware function, or both) of the present device at least in part in based on verification of the signed nonce at block 308 and/or receipt of the signal(s) at block 300. E.g., the logic may disable text and telephone call communication at the present device.

Still in reference to the logic of FIG. 3, from block 310 the logic proceeds to decision diamond 312. At diamond 312, the logic determines whether a threshold time has expired (e.g. without receiving another BLE signal from the same beacon as provided the first signal that was received at block 300) and/or determines whether a second signal from the same beacon has not been received at e.g. a designated time at which the present device was to receive such a signal. A negative determination at diamond 312 causes the logic to continue making the determination thereat until an affirmative determination is made. Then, responsive to an affirmative determination, the logic proceeds from diamond 312 to block 314.

At block 314 the logic disables the first function that was enabled at block 310 and/or enables the second function that was disabled at block 310. The logic then proceeds to block 316, at which the logic monitors for receipt of another signal from the beacon that provided the signal(s) received at block 300 (and/or for receipt of a signal from a different beacon). In addition to or in lieu of the foregoing but still at block 316, the logic may transmit a second nonce to the beacon that provided the signal(s) received at block 300. From block 316 the logic proceeds to decision diamond 318, at which the logic determines whether the present device has received back the second nonce signed and/or executed by the beacon e.g. within a threshold time of transmission of the nonce at block 316. A positive determination at diamond 318 causes the logic to move back to block 310 and proceed therefrom. However, a negative determination at diamond 318 causes the logic to move back to block 314, at which the logic may continue to render the first function disabled and/or render the second function enabled.

Figure 4:
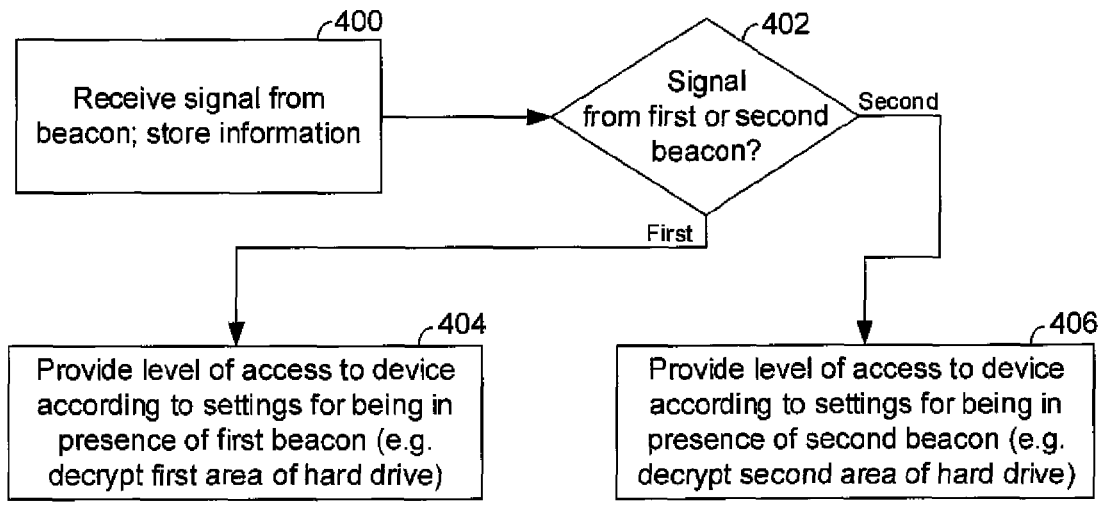

Continuing the detailed description in reference to FIG. 4, it shows example logic that may be undertaken by a device such as the system 100 (referred to below as the present device) in accordance with present principles. The logic of FIG. 4 may be executed in conjunction with or separate from the logic of FIG. 3. In any case, the logic begins at block 400 where the logic receives at least a first (e.g. Bluetooth low energy (BLE)) signal from a (e.g. BLE) beacon. The signal(s) may contain one or more of location information for the location of the beacon and/or present device, one or more keys such as e.g. public (e.g. encryption) keys, authentication information, and/or other encryption and/or decryption information. In any case, note that also at block 400 the logic may store the information that has been received.

From block 400 the logic proceeds to decision diamond 402 at which the logic determines whether the signal and/or associated information were from a first beacon or a second beacon different then the first beacon. Responsive to a determination at diamond 402 that the signal was from the first beacon, the logic proceeds to block 404 at which the logic provides and/or otherwise enables a first level of access at and to the present device according to settings (e.g. stored locally on the present device) for being in the presence of the first beacon, such as e.g. decrypting a first area of a hard drive of the present device for access thereto (e.g. using information received at block 400). However, responsive to a determination at diamond 402 that the signal was from the second beacon different from the first beacon, the logic instead proceeds to block 406 at which the logic provides and/or otherwise enables a second level of access at and to the present device different from the first level of access according to settings (e.g. stored locally on the present device) for being in the presence of the second beacon, such as e.g. decrypting a second area of a hard drive of the present device for access thereto (e.g. using information received at block 400).

Figure 5:
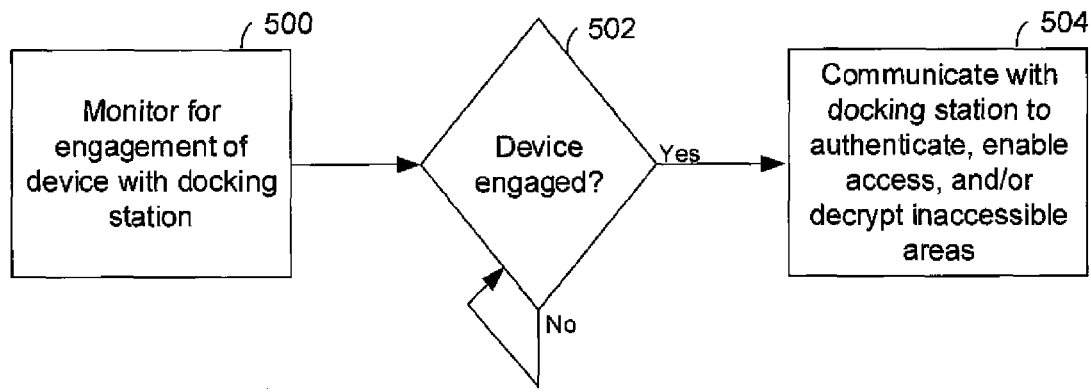

Reference is now made to FIG. 5, which also shows example logic that may be undertaken by a device such as the system 100 (referred to below as the present device) in accordance with present principles. Also note that the logic of FIG. 5 may be executed in conjunction with or separate from the logic of FIGS. 3 and 4. In any case, the logic of FIG. 5 begins at block 500 where the logic monitors for engagement of the present device with a docking station. The logic then proceeds to decision diamond 502 at which the logic determines whether the device has been engaged with a docking station. A negative determination thereat causes the logic to continue to making the determination of diamond 502 until an affirmative determination is made. Then, responsive to an affirmative determination at diamond 502, the logic proceeds to block 504. At block 504 and at least in part in response to engagement of the present device with the docking station, the logic communicates with the docking station to authenticate the present device and/or docking station, to enable access to one or more features of the present device (e.g. responsive to successful authentication), and/or to decrypt e.g. otherwise inaccessible areas of the storage area for the present device.

Note that although not specifically shown in FIG. 5, it is to be understood that the logic may determine e.g. whether the present device has been engaged with a first docking station or a second docking station different from the first docking station. Then e.g. the logic may provide different levels of access, etc. as discussed herein responsive to determining which of the two docking stations with which the present device has been engaged e.g. based on access level settings. Also note that in some embodiments, the communication between the present device and docking station may be set (e.g. by a network administrator) to e.g. be only wired communication so that e.g. wireless hijacking of the communication is disallowed.

Continuing the detailed description in reference to FIG. 6, it shows an example data table 600 that may be accessed by a device in accordance with present principles when e.g. determining a level of access to provide on the device, determining functions to enable or disable on the device, etc. responsive to e.g. receiving a signal from a beacon as discussed herein. The data table 600 may be stored locally on the device and/or e.g. in a cloud storage area and/or USB drive accessible to the device. In any case, the data table 600 includes a first column 602 indicating different beacons and/or docking stations for which settings have been configured. Thus, responsive to receipt of e.g. a BLE signal from a beacon containing identifying information for the beacon, the logic may access the table 600 and using the information match the received identifying information with an entry from the column 602.

Thus, once an entry from the column 602 is matched, the logic may then gather information from columns 604 and 606 associated with the respective entry (e.g. and hence associated with the respective beacon and/or docking station and/or current location of the device) for functions, hardware, software, etc. for which to enable or disable access, respectively. As may be appreciated from the table 600 e.g. the entry for the first beacon at column 604 indicates that all functions for the device are to be enabled (e.g. responsive to receipt of a signal from the first beacon). Also, as indicated at column 606, no functions are to be disabled when the device is in the presence of the first beacon (e.g. as determined based on the received signals therefrom).

Note however that the entry for the second beacon indicates at column 604 that, instead of e.g. all functions for the device being enabled, the following are to be enabled (e.g. automatically without user input responsive to receipt of a signal from the second beacon): a first section of a hard disk drive of the device, email communication by the device, peripheral device (e.g. mouse, keyboard, display) use, and access to at least one server. Also, as indicated at column 606 for the respective entry, the following functions are to be disabled when the device is in the presence of the second beacon (e.g. automatically without user input responsive to receipt of the second from the second beacon): text and telephone communication, use of the camera hardware device, and/or photo sharing (e.g. using a photosharing application and/or even using an otherwise enabled email application specifically to share photos (e.g. as attachments)).

The example table 600 also shows an entry at column 602 for a docking station which at column 604 indicates that the following are to be enabled (e.g. automatically without user input responsive to receipt of a signal from the docking station): access to a projector display e.g. communicatively connected to the docking station and/or the device, and use of a word processing application installed on the device. Also for the entry for the docking station but at the column 606, the table 600 indicates that Internet access at the device is to be disabled (e.g. automatically without user input responsive to receipt of a signal from the docking station).

Continuing the detailed description in reference to FIG. 7, it shows an example user interface (UI) 700 for presentation on a device for configuring settings in accordance with present principles (e.g. levels of access to the device, enablement or disablement of one or more functions, hardware of the device, software applications of the device, etc.). As may be appreciated from FIG. 7, the UI 700 indicates that the current settings for a first beacon include enablement of all functions and hence disablement of none. However, note that respective change selector elements 702 and 704 are shown for respectively changing functions that are to be enabled or disabled for the device based on e.g. receipt of signals from the first beacon and/or receipt of a signed nonce from the first beacon in accordance with present principles. Thus, e.g. automatically without further user input responsive to selection of either of the elements 702 and 704, another UI may be presented and/or overlaid on the UI 700 to change settings for either enabled functions or disabled functions when e.g. the device is in the presence of the first beacon.

As may also be appreciated from FIG. 7, the UI 700 indicates that the current settings for a second beacon include enablement of access to section thirty four of the device's hard disk drive and access to at least one server. The UI 700 also indicates that the current settings for the second beacon include disablement of access to e.g. games and/or a game center application of the device, as well as disablement of access to a music player of the device. Also, note that respective change selector elements 706 and 708 are shown for respectively changing functions that are to be enabled or disabled for the device based on e.g. receipt of signals from the second beacon and/or receipt of a signed nonce from the second beacon in accordance with present principles. Thus, e.g. automatically without further user input responsive to selection of either of the elements 706 and 708, another UI may be presented and/or overlaid on the UI 700 to change settings for either enabled functions or disabled functions when e.g. the device is in the presence of the second beacon.

In addition to the foregoing, note that the UI 700 also includes a selector element 710 selectable to e.g. present another UI and/or overlay the other UI on the UI 700 to configure settings for the device in accordance with present principles for when in the presence of another beacon for which settings have yet to be configured. Likewise, a selector element 712 is also shown, which is selectable to e.g. present another UI and/or overlay the other UI on the UI 700 to configure settings for the device in accordance with present principles for when e.g. engaged with a docking station for which settings have yet to be configured. Furthermore, note that once settings are configured for such an additional beacon or docking station, those settings may accordingly be indicated on the UI 700.

Figure 8:
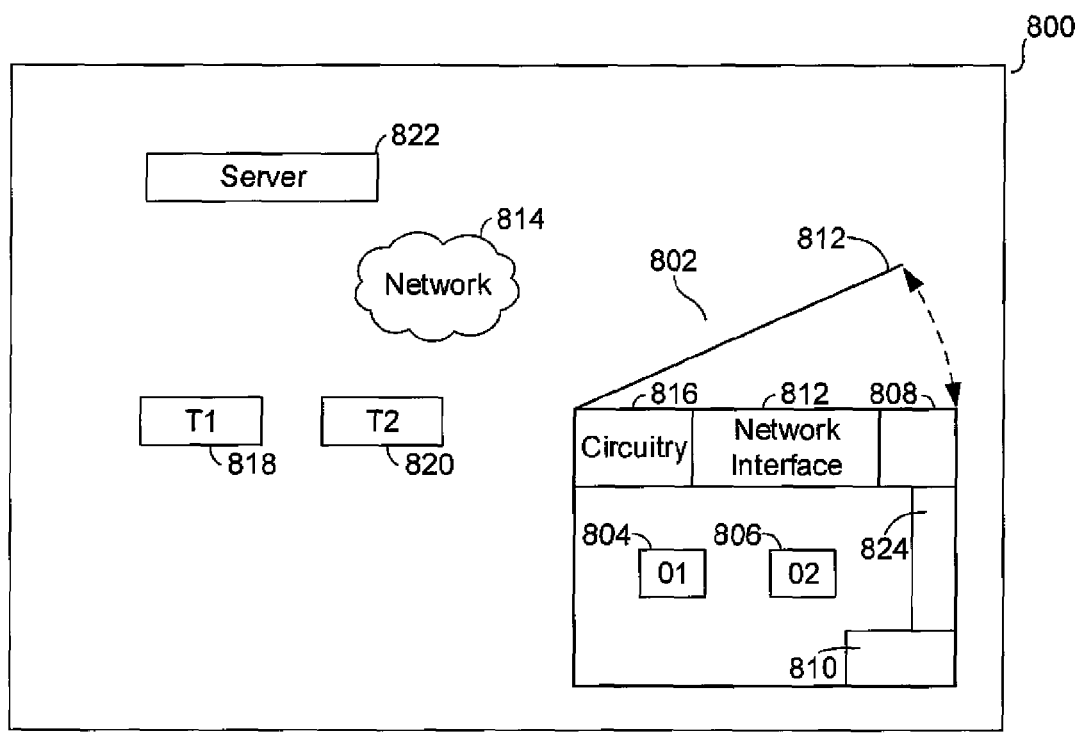
FIG. 8 is an example of an enclosure including plural devices and an electromagnetically isolating container in accordance with present principles.

Now in reference to FIG. 8, it shows an example enclosure 800 in which a container 802 that may be transportable is disposed and which provides a first level of electromagnetic isolation for one or more devices, such as e.g. the first device 804 and a second device 806. The devices 804 and 806 may be e.g. laptop computers, convertible computers, tablet computers, smart phones, etc. The container 802 also includes a first sensor 808 for sensing whether the container 802 is open and/or unlocked, or closed and/or locked (e.g. as represented by the container lid 812 being shown in an open configuration for the container 802) and a sensor 810 for sensing whether one or more devices are within the container 802 (e.g. for sensing the devices 804 and 806). It is to be understood that the sensors 808 and 810, as well as e.g. a network interface 812 to be described shortly, are configured to communicate with and/or provide input to the circuitry 816. What's more, the devices 804 and 806 may communicate with the circuitry 816 via e.g. the network interface 812.

Still further, the network interface 812 of the container 802 is understood to provide access to a network 814 that extends beyond the electromagnetic isolation of the container 802 and e.g. provides for communication with a first terminal 818 (e.g. a desktop computer), a second terminal 820, and a server 822 that may all be disposed e.g. in the same enclosure 800 as the container 802.

Still in reference to FIG. 8, it is to be understood that the circuitry 816 is configured to automatically authenticate devices placed in the container 802 in accordance with present principles, and furthermore may e.g. authenticate the devices 804 and 806 in response to detection of the devices 804 and 806 within the container 802 and/or a determination that the container 802 is in a closed configuration to thus allow the devices 802 and 804 to communicate over the network 814 (e.g. responsive to authentication). Thus, in some embodiments the circuitry 816 e.g. may only authenticate devices once the container lid 812 has been placed in a closed configuration and/or has been locked to thus establish a closed and/or locked configuration for the container 802 itself.

Describing the electromagnetic isolation of the devices 804 and 806 as facilitated by the container 802, it is to be understood that the container 802 may isolate the devices 804 and 806 from e.g. sending and receiving data and/or communications at some frequencies while permitting the devices 804 and 806 to send and receive data and/or communications at other frequencies. E.g., frequencies used for cellular telephone communications from outside the container 802 may be shielded by the container 802 from reaching the devices 804 and 806, while e.g. relatively high-speed wireless Internet frequencies may be permitted to pass through the electromagnetically isolating surfaces included on and/or forming a housing of the container 802. Thus, e.g., in example embodiments the container 802 may permit frequencies from 2400 megahertz to 5900 megahertz to penetrate the container and hence reach the devices 804 and 806 (e.g. responsive to a determination that the container 802 is in a closed configuration), but not permit frequencies from 380 megahertz to 2100 megahertz to penetrate the container.

Still further, it is to be understood that the container 802, e.g. upon authenticating the devices 804 and 806 and permitting communication by the devices 804 and 806 with devices outside the container 802 such as e.g. terminals 818 and 820 at e.g. only certain frequencies such as from 2400 megahertz to 5900 megahertz, may facilitate e.g. rights management by the server 822 to permit the terminals 818 and 820 to access some by not all data, files, applications, other resources, etc. on the respective devices 804 and 806 based on e.g. permissions and/or settings configured for the devices 804 and 806 for when they are in the container 802.

Still in reference to FIG. 8, it is to be understood that in some embodiments the container 802 may include a battery charger 824 for wirelessly charging respective batteries of the devices 804 and 806 when the devices 804 and 806 are in the container (e.g. in one embodiment, the battery charger 824 may only be charged responsive to a determination by the circuitry that the container 802 is in its closed configuration and/or locked).

Without reference to any particular figure, it may now be appreciated that systems, devices, and/or methods are provided for e.g. securely authenticating a device and/or the beacons themselves that are described herein. Thus, it is to be understood that the beacons described herein may validate the device similarly as devices may validate beacons as described herein (e.g. at least in part using a nonce and validation).

It may also now be appreciated that environments such as schools, offices, hospitals, and/or kiosks may use present principles to enable secured communications and device functionality control for e.g. internal electronics assets and BYOD (bring your own device) integration. Furthermore, present principles provide for "no-touch" implementation of control policy and device functionality by a user when a given device is dock-attached and/or within the signal range of a e.g. BLE beacon as set forth herein.

Present principles thus allow for the linking up of a device to another device and/or network in a relatively intuitive if not relatively seamless way for e.g. end-users by e.g. the device being placed within e.g. an enclosure where BLE signals are being broadcasted and/or placed in a docking station.

Present principles further recognize that the settings, enablements, disablements, etc. discussed herein may be configured on a per-device basis to thus allow for e.g. personalized, controlled content and/or functionality based on the physical presence of the device in a docking station and/or an enclosure (e.g. a room) where BLE signals from a beacon are being broadcasted. Thus, it is to be further understood that different devices may be configured to provide different capabilities, levels of access, content, functionality, etc. within the same enclosure and/or when engaged with the same docking station. It is to also be understood that the same device may be configured to provide different capabilities, levels of access, content, functionality, etc. within the different enclosures and/or when engaged with a different docking station.

Accordingly, in at least one respect present principles allow for "lockdown" of connected device(s) (e.g. once placed in the container 802). The lockdown may be physical, such as e.g. no interface being allowed and/or presented for use until the device is docked and locked thereat and/or until the device is within the signal range of a beacon. The device may thus remain secure until within an enclosure and/or docking station that is locked and secure. Furthermore, this "locking" may be software-based with e.g. specific policy implementation upon successful dock authentication and/or enclosure "handshaking" such as e.g. authentication and exchange of keys. The foregoing allows e.g. a system administrator to control behavior and policies by providing a way to implement device access policies where functionality needs to be limited or otherwise modified such as e.g. to turn off texting or phone ringing in a school or education environment.

As an example, present principles provide for modification and/or decryption of protected data e.g. only when a device is docked and/or inside an enclosure. However, device portability is not hindered since the device may still be taken out of the dock and/or enclosure while nonetheless still maintaining device security e.g. in case of loss or theft of the device.

Put another way, present principles may allow for connection of a device to a dock and/or receipt of signals from a beacon to thus allow for (e.g. relative to an end-user) automatic, seamless authentication and interconnect of various devices. In some embodiments, device to dock communication and/or authentication occur prior to access being allowed to downstream and/or other network-connected devices and in this respect present principles may provide for e.g. hardware-based authentication.

E.g., installation and/or placement of device onto dock can trigger hardware or software-based authentication algorithms to authenticate the device and/or user. Thus, devices may be hardware-paired (e.g. such as at time of deployment) with docks to limit access to certain areas of the device and/or environments with secure relatively no-touch authentication thus avoiding that a person understand the various subtleties of authentication and security for their devices and implement them themselves.

Further still and as may be appreciated from present principles, the present application uses BLE beacons to provide location information, and/or leverages encryption between the device and beacon to e.g. ensure that device can only be enabled or used when the location in which it is disposed has been verified. E.g., a secure USB-connected hard drive may be paired with an in-room BLE beacon. During the (e.g. initial) pairing process, the beacon may generate a new public/private key pair, send the public key to the hard drive, and store the private key securely. Then, e.g. in the future, for that secure hard drive to be used, the drive sends a random nonce to the paired beacon, the beacon signs the nonce, and sends it back to the device. The drive may thus verify the signed nonce using the stored public key, and e.g. only then enable the drive. Furthermore, in some embodiments transmission of encryption keys in accordance with present principles may be such that the drive's data is e.g. only allowed to be decrypted using that key. The foregoing applies to access to other devices such as e.g. other peripheral devices and/or displays which may be configured to e.g. only fully power-on once they've completed the secure "handshake" with a beacon and/or docking station.

Discussing the beacons disclosed herein, it is to be understood that in an example embodiment the beacon may continually transmit location data, which a device may receive and/or check for on a periodic basis to ensure that it is being used within the relatively constrained environment in which the beacon is disposed (e.g. a classroom, a hospital, etc.). What's more, it is to be understood that e.g. in environments such as e.g. a school where plural such beacons may be used in accordance with present principles but where they are for different classrooms and/or for providing different levels of access, and where e.g. plural beacon signals from different beacons are detected, the device may be configured to use triangulation to determine signal strength and thus the nearest beacon, and thus the appropriate settings to enable or disable for the device.

Accordingly, it may now be appreciated that e.g. a hard drive may not be decrypted if it is removed from a room in which it has been decrypted in accordance with present principles. As another example, e.g. a display may not (e.g. fully) power on if it is not located within a room for which it has been configured to be used in accordance with present principles.

It may thus be appreciated that present principles provide for security of data as well security of the peripherals. What's more, the beacons themselves may be physically protected by e.g. locking or otherwise securing them in boxes mounted on the wall or in the ceiling of a location in which they are disposed to e.g. prevent unauthorized tampering with the device. Notwithstanding, it is to be understood that the beacon and/or its enclosure may be relatively portable, such as e.g. being in a bag or being mounted in the glove compartment of a vehicle.

It may also be appreciated that present principles allow for lifecycle management of e.g. all-in-one (AIO) platforms due to different cycles of displays and devices (e.g. to plug and play new hardware via enclosure). Thus, the number of connectivity standards are simplified, both e.g. wireless/antennas and ports. Thus, bring-your-own-device (BYOD) approaches are enabled using present principles while still maintaining security of the devices and/or limiting functionality of the devices where appropriate such as e.g. at a school, office, hospital, or kiosk.

Present principles involving interconnect opportunities as discussed herein allow for enhancement of existing devices such as by e.g. extending the display size (e.g. by using a bigger display in a room), providing additional storage, battery life for the device, etc. Thus, present principles allow for different devices to securely connect to e.g. a common display.

Also, e.g. different devices enable personalized and controlled content based on physical presence in or around the enclosure. Thus, multiple beacons may provide for different capabilities or content, and/or desk-space savings by e.g. mounting the beacon's enclosure behind a display, on a wall, car glove box, or other out-of-the-way place, etc.

Providing further examples of present principles such as e.g. enclosure-based and secure interconnection of devices, a first example is a school environment. A user may bring their own device (e.g. smartphone, tablet, etc.), running an application/service and place their device within the school enclosure. The device handshakes with the enclosure to determine functionality, control, and security policies (e.g. either owing to the enclosure being a "smart" enclosure, and/or owing to an application on the device knowing that enclosure in a particular place needs certain types of characteristics). As far as functionality in this example, the device may then be connected to peripherals such as a keyboard, mouse, display, storage, etc., and files may be pulled from the device by e.g. a teacher's computer (e.g. homework or quizzes). As far as a security policy in this example goes, the device may be limited in function to only be configured to access a particular portion of the school's network while also e.g. disabling texting, camera use, etc. Furthermore, different levels of access to the same device may change depending on which room and/or beacon the device communicates with.

A second example is an office environment embodying present principles (e.g. BYOD enablement). The beacon may be placed an enclosure behind and/or with an AIO-type system. Security policy, network connectivity, file access, and/or application policy may be enforced on a per-enclosure basis. Sensitive data may only accessible or unencrypted when a device is in or near the enclosure. Shell AIO enclosures may also be used to e.g. allow for the different lifecycles of displays such as e.g. a 5-year refresh cycle, a 3-year refresh cycle, or personal platform 2-year refresh cycle.

A third example is a hospital environment embodying present principles (e.g. BYOD enablement). Present principles may be used to allow access to confidential records on a device e.g. only when the device has authenticated to an appropriate enclosure. Data transfer may be limited as well in accordance with present principles. Moreover, location-based information may be used to vary the level of access, functionality, etc. based on which enclosure (e.g. which area of the hospital) the device is in. This may apply when e.g. accessing chart and/or diagnostic information for a patient. Thus, each hospital staff member may have their own device while still meeting lockdown requirements and data errors among patients. E.g., a nurse may enter a first room and only be presented with a UI listing a first patient's medication to administer, and then walk into a second room and only be presented with a different UI listing a second patient's medication to administer.

A fourth example is a kiosk environment. High speed connections may be enabled based on the enclosure. Furthermore, e.g. once a service associated with the kiosk is paid for and the device is placed within the environment, the service may be automatically started and/or initiated to thus e.g. act like a check-out button and initiate checkout and/or exchange of payment information. Thus, e.g. NFC and/or tap connection may not be needed. Further, prior arrangements made with the kiosk can be executed. Further still, such a kiosk may automatically pull photos from applications and/or folders on the device. Thus, e.g. using RedBox as an example, audio video content may be loaded onto a smart phone via a high speed connection when the device is at or near a RedBox kiosk.

A fifth example is a vehicle environment. A device may be placed in vehicle, and e.g. texting may be automatically disabled while e.g. connection of the device to an in-car computer and/or car-mounted computer may be automatically enabled, thus helping to eliminate instances where a device may e.g. (e.g. Bluetooth) pair with the wrong device (e.g. in a location other than the vehicle).

A sixth example is a home environment. A wall-based enclosure may plug into a power supply and connect to TV (e.g. wired or wireless). Keyboard and/or mouse I/O may thus be added. The device may also know it is "home" for home automation of various settings (e.g. nest).

Without reference to the examples discussed above, it is to be understood that the handshaking (e.g. authentication and exchange of encryption information) discussed herein may be done using communication other than Bluetooth communication, such as e.g. NFC communication. Furthermore, mobile device management (MDM) may be used in accordance with present principles. E.g., an area of a smart phone may be encrypted except when in the presence of a particular beacon.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or signal per se.

While the particular PROVIDING ACCESS TO AND ENABLING FUNCTIONALITY OF FIRST DEVICE BASED ON COMMUNICATION WITH SECOND DEVICE is herein shown and described in detail, it is to be understood that the subject matter which is encompassed by the present application is limited only by the claims.

What is claimed is:

1. A first device, comprising:
a processor; and
a memory accessible to the processor and bearing instructions executable by the processor to:
receive at least a first Bluetooth low energy (BLE) signal from a BLE beacon; and
enable a first function of the first device at least in part in based on receipt of the first BLE signal, wherein the first BLE signal contains location information for a first location in which the first BLE beacon in disposed, wherein the instructions are executable to:
enable the first function for a threshold time in response to receipt of the first BLE signal; and
disable the first function in response to expiration of the threshold time during which at least one subsequent BLE signal containing the location information is not received.

2. The first device of claim 1, wherein the first BLE signal contains location information for a first location in which the first BLE beacon is disposed, and the instructions are executable to enable the first function only in response to receipt of the location information, the instructions being executable to otherwise disable the first function.

3. The first device of claim 1, wherein the first function that is enabled is ability of the first device to communicate with other devices.

4. The first device of claim 1, wherein the first function is enabled at least in part in based on receipt of the first BLE signal and wherein a second function different from the first function is disabled at least in part based on receipt of the first BLE signal.

5. The first device of claim 4, wherein the second function is one of receipt of a telephone call and receipt of a text message.

6. The first device of claim 1, wherein a first hardware component of the first device is enabled at least in part in based on receipt of the first BLE signal.

7. The first device of claim 1, wherein the first function is access to an encrypted portion of a hard drive of the first device.

8. The first device of claim 1, wherein the first function is presentation of data stored at the first device on a display of a second device different from the first device.

9. A first device, comprising: a processor; and
a memory accessible to the processor and hearing instructions executable by the processor to:
receive at least a first Bluetooth low energy (BLE) signal from a BLE beacon;
enable a first function of the first device at least in part in based on receipt of the first BLE signal;
receive at least a second BLE signal at a predefined time subsequent to receipt of the first BLE signal; and
responsive to not receiving the second BLE signal at the predefined time, disable the first function.

10. The first device of claim 9, wherein the first BLE signal contains location information for a first location in which the first BLE beacon is disposed, and the instructions are executable to enable the first function only in response to receipt of the location information, the instructions being executable to otherwise disable the first function.

11. The first device of claim 9, wherein the first function that is enabled is ability of the first device to communicate with other devices.

12. The first device of claim 9. wherein the first function is access to an encrypted portion of a hard drive of the first device.

13. The first device of claim 9, wherein the first function is presentation of data stored at the device on a display of a second device different from the first device.

14. The first device of claim 9, wherein the first function is enabled at least in part based on receipt of the first BLE signal and wherein a second function different from the first function is disabled at least in part based on receipt of the first BLE signal.

15. The first device of claim 9, wherein a first hardware component of the first device is enabled at least in part in based on receipt of the first BLE signal.

16. The first device, comprising:
a processor; and
a memory accessible to the processor and bearing instructions executable by the processor to:
receive at least a first Bluetooth low energy (BLE) signal from a BLE beacon;
enable a first function of the first device at least in part in based on receipt of the first BLE signal; wherein the first BLE signal includes a public key, and wherein the instructions are further executable to:
store the public key;
transmit a nonce to the provider of the first BLE signal;
receive from the provider the nonce signed by the provider;
verify the signed nonce using the public key; and
enable the first function of the first device at least in part based on verification of the signed nonce.

17. The first device of claim 16, wherein the public key is a public encryption key is a public encryption key.

18. The first device of claim 16, wherein the first function is access to an encrypted portion of a hard drive of the first device.

19. The first device of claim 16, wherein the first function is presentation of data stored at the first device on a display of a second device different from the first device.

20. The first device of claim 16, wherein the nonce is a first nonce, and wherein the instructions are executable to:
transmit a second nonce to the provider of the first BLE signal;
in response to expiration of a threshold time during which receipt of the second nonce signed by the provider does not occur, disable the first function.

21. The first device of claim 16, wherein all functions for the first device including the first function are enabled at least in part based on receipt of the first BLE signal, and wherein all functions for the first device including the first function are disabled in response to failure to receive from the provider the second nonce signed by the provider.

22. The first device of claim 16, wherein the first BLE signal contains location information for a first location in which the first BLE beacon is disposed, and the instructions are executable to enable the first function only in response to receipt of the location information, the instructions being executable to otherwise disable the first function.

23. The first device of claim 16, wherein the first function that is enabled is ability of the first device to communicate with other devices.

24. The first device of claim 16, wherein the first function is enabled at least in part in based on receipt of the first BLE signal and wherein a second function different from the first function is disabled at least in part based on receipt of the first BLE signal.

25. The first device of claim 16, wherein a first hardware component of the first device is enabled at least in part in based on receipt of the first BLE signal.

26. A method, comprising:
receiving at least a first Bluetooth low energy(BLE) signal from a BLE beacon; and
enabling the first function of a first device at least in part in based on receipt of the first BLE signal, wherein the first BLE signal contains location information for a first location in which the first BLE beacon is disposed, and wherein the enabling comprises:
enabling the first function for a threshold time in response to receipt of the first BLE signal; and
disabling the first function in response to expiration of the threshold time during which at least one subsequent BLE signal containing the location information is not received.

27. The method of claim 26, further comprising:
responsive to determining that the first BLE signal is from the BLE beacon, decrypting the otherwise inaccessible area of the hard drive at least in part using information included in the first BLE signal to provide the first level of access to the first device.

\* \* \* \* \*